United States Patent
Kemenczky

[11] 3,806,246
[45] Apr. 23, 1974

[54] MOTION PICTURE PROJECTORS
[75] Inventor: Miklos Kemenczky, Greenbrook, N.J.
[73] Assignee: Paul Guilden, New York, N.Y.
[22] Filed: Nov. 24, 1972
[21] Appl. No.: 308,950

Related U.S. Application Data
[62] Division of Ser. No. 196,916, Nov. 9, 1971, abandoned.

[52] U.S. Cl. ............................................. 352/181
[51] Int. Cl. ........................................ G03b 21/48
[58] Field of Search .......... 352/181, 187, 188, 189, 352/190

[56] References Cited
UNITED STATES PATENTS
941,154  11/1909  LaPointe ........................... 352/188
1,152,989  9/1915  Taylor ................................ 352/188
2,994,247  8/1961  Baptista ......................... 352/181 X

*Primary Examiner*—Monroe H. Hayes

[57] ABSTRACT

A motion picture projector has a rotary sprocket with teeth for engaging and advancing the film. The sprocket is driven by a constant speed drive shaft connected to the sprocket through a slip clutch. A retractable stop element periodically engages the teeth on the sprocket to prevent rotation of the sprocket while the drive shaft continues to rotate.

3 Claims, 8 Drawing Figures

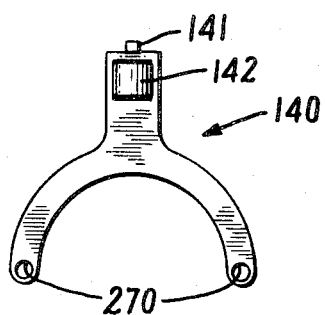
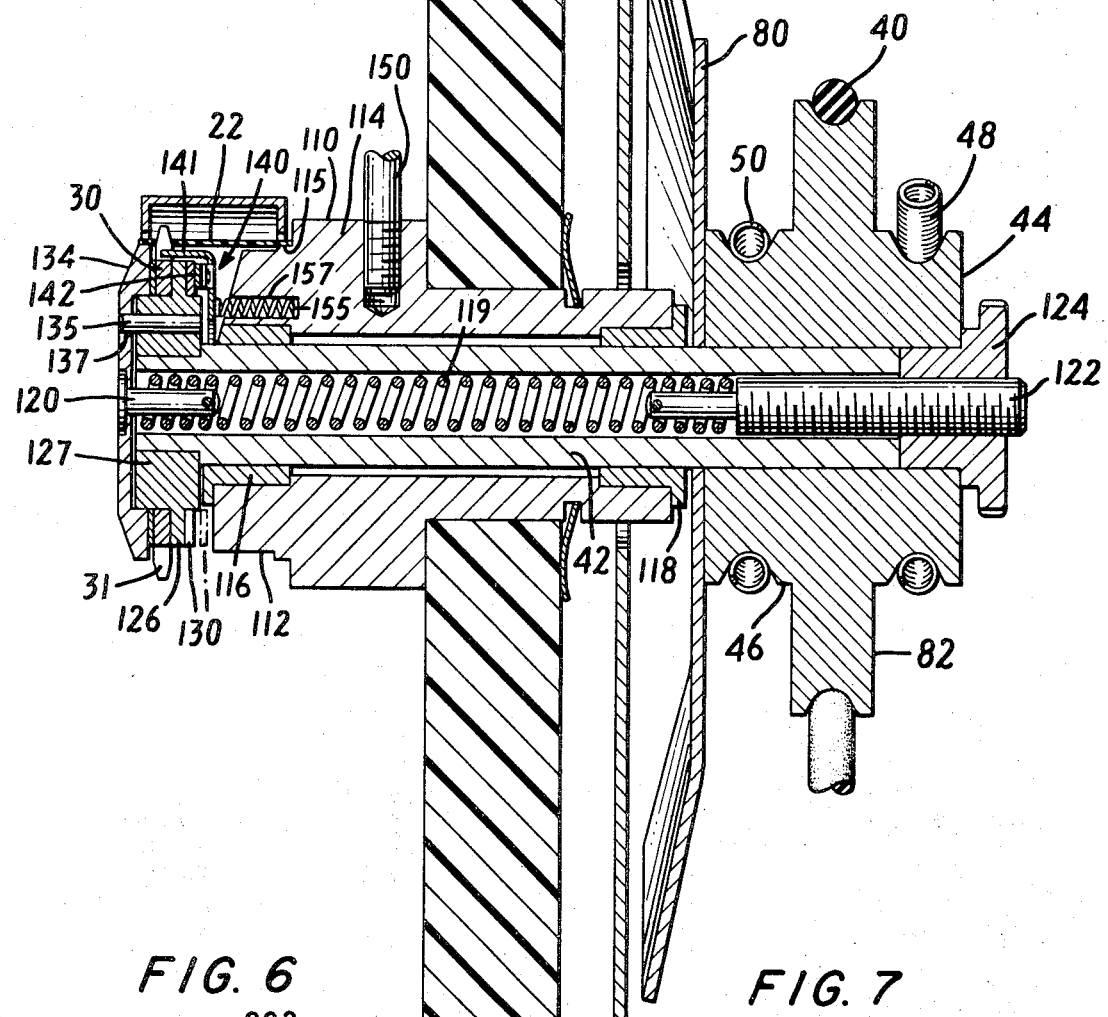
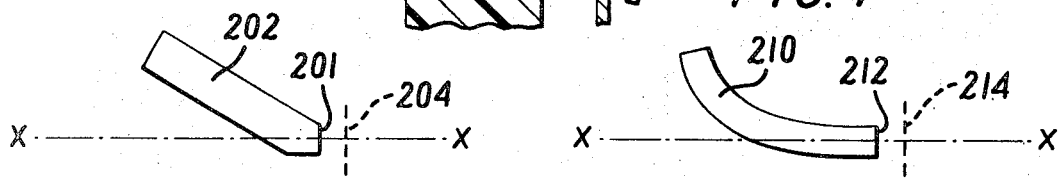

MOTION PICTURE PROJECTORS

BACKGROUND OF THE INVENTION

This is a division of application Ser. No. 196,916 filed Nov. 9, 1971, now abandoned.

Motion picture projectors usually include a film supply spool as well as a take-up along with driven sprockets which unwind the film from the supply spool and release film for winding onto the take-up spool. Additionally, a film feeding device such as a claw mechanism is provided for advancing the film through the film gate past the aperture thereof at a specified and requisite speed, such device functioning intermittently to advance the film in stepwise movement so that each picture frame is momentarily stopped in register with the aperture. It is customary when using known types of motion picture projectors to leave a loop in the film at the entrance and exit sides of the film gate in order to insure that the film feeding device which advances the film through the film gate into viewing position in stepwise movement at a speed different than the speeds at which the film removes from the supply spool and taken-up on the take-up spool does not place a momentary tension of excessive magnitude on the film which could result in tearing of the film where the feeding device engages in perforations at the side of the film strip, or such stress on the film during advance as would cause loss of precision in positioning the film in the film gate and thereby causing image flutter on the viewing screen. The problem of film damage or wear of the sprocket holes therein is magnified in such projector types by virtue of the feeding device engaging only one sprocket hole during each film advance movement. Known projector types which utilize the free standing loop require a minimum of two power driven toothed sprockets to isolate the film feeding from the unwinding and take-up film spools. These two sprockets are gear driven and turn continuously in engagement with the film at the proper film speed, while the film feeding device such as a claw only intermittently engages the film and moves at least instantaneously at a different linear speed than the sprockets. The film wind and unwind spool devices on such projectors are generally provided on a slipping belt mechanism since their function is to provide continuous gentle tension on the film and, as the diameter of the film on each spool changes with winding or unwinding, the spool r.p.m. also must change since the rim speed thereof must be constant. Therefore the unwinding spool is generally powered in the opposite direction to film travel through a slipping belt and the take-up spool is powered, also through a slipping belt, in the normal film travel direction at what would be a much higher rate of speed if it were free to turn. The film of course holds it back and the take-up belt drive continuously slips keeping tension on the take-up spool. Thus, known projector types require two geared sprockets at two different locations plus a complex motion claw at a third location to properly advance the film through the projector; all three of which must work in absolute unison. Such requirement of providing two power driven sprockets in addition to the film feeding device is an expedient which if eliminated or simplified, would make projector construction simpler and less expensive. Elimination of unnecessary components in projector manufacture when the same are manufactured on large mass produced scale can result in very substantial cost savings.

An additional consideration in respect of most types of projectors is that they employ a shutter device commonly in the form of a rotating bladed disc which rotates about an axis parallel with the objective axis of the projector with the blades traversing a course at a location intermediate the projection lamp and the film gate to momentarily block passage of light through the film gate and objective when the film is being moved into and out of register with the film gate aperture. Since it is common to provide only one prime mover, i.e., an electric motor drive as the means for powering all operating mechanisms in the projector, and since the film feeding device customarily involves operation of a rotary element in an axis perpendicular to the objective axis, it is necessary to provide a number of power transmission components for the purpose of operating the shutter device at a right angle with the drive to the film feeding device. If the need for such arrangement of transmission components could be eliminated from the projector by operating the shutter in rotation from a common drive shaft and about a common axis with the rotating film feeding device, a further considerable manufacturing savings could be achieved and a simplified projector apparatus construction provided.

SUMMARY OF THE INVENTION

The present invention has for an important purpose, the elimination or modification in a motion picture projector of certain power driven components associated with the unwinding of film from the supply thereof and release of the same to the take-up spool. There is thereby achived a reduction in the cost of projector manufacture as well as a simplification in the construction and operation of the same. In addition, the present invention provides a gentler handling of the film during its travel through the projector especially in respect of lessening wear on the film sprocket holes. Furthermore, the shutter device associated with the operation of the projector and employed to block the projection of light through the film gate and objective during the times the film is actually being moved into and out of the film gate aperture is simplified in that the shutter is located offset a distance from the objective principal axis and is operated from a common drive shaft with the film feeding device which advances the film past the film gate in such manner as eliminates the need to provide power transmission components for driving the shutter on an axis at a right angle to the axis of rotation of the film feeding device.

In accordance with the present invention, a motion picture projector having the customary objective, film gate, film supply spool and film take-up spool is provided with a pair of idler rollers supported rotatably on the projector, one at the location at which the travel course of the film passes onto a film feeding means rotary sprocket, and the other at the location of the exit of the film from the film gate. Such idler rollers provide guide means maintaining corresponding loops in the travel course of the film through the projector. Since the linear speed at which the film is taken-up on the take-up spool and that at which the film removes from the supply spool (ideally, the wind-up and unwind speeds are equal) is instantaneously different than the speed at which the film is advanced in stepwise movement through the film gate, there will occur cyclically a tautening and releasing of the film loops resulting from such differences in speed. To compensate for occurrence of such tautening and thereby preclude damaging the film or loss of framing accuracy due to stress on the film during positioning in the film gate, the idler rollers have at least a surface layer of resilient material thereon which is radially and circumferentially yieldable to the tautening of the film in the loops thereby relieving the tautening effect. In one form, the idler rollers include a rigid hub portion and en encircling hollow circular resilient portion fixed to the hub portion, with the hollow circular portion being a foam-like material such as sponge rubber, foamed thermoplastic, etc.

A further feature of the present invention provides that the shutter device associated with the blocking-off of light to the film gate and objective during the time the film is actually being moved into and out of the film gate is mounted on the same shaft which drives the film feeding rotary sprocket. In this manner, the shutter device rotates about an axis perpendicular to the principal axis of the objective rather than rotating about an axis parallel to the objective axis as found in conventional motion picture projectors. The present invention in providing that the rotation of the shutter device about the same axis as the film feeding rotary sprocket rotates and being driven therewith from a common shaft requires but a single power transmission to such shaft, simplified considerably the projector construction. Arrangement of the rotating shutter device in this manner as distinguished from that employed in known projector types, involves disposition of the projection lamp at a location laterally spaced a distance from the principal axis of the objective. Means is provided for directing a beam of light emanating from the projector lamp to a location adjacent the aperture of the film gate, as well as means for reflecting the light beam through the aperture and axially through the objective. Such means can be provided as a tubular element, or a light conductor component, such as a solid element, which is internally reflective throughout its length can be used.

The present invention also provides that the film feeding mechanism, which includes a rotary sprocket, a drive shaft, and clutch means to drivably connect the rotary sprocket with the drive shaft are mounted in a housing located on suitable supporting structure in the motion picture projector, the housing being supported to be rotatable about the same axis as which the rotary sprocket rotates to permit angular adjustment of the housing to shift the positioning of film being fed past the film gate thereby to adjust the framing of the picture frames in the film gate aperture. Rotation of the rotary sprocket to advance the film in stepwise movement through the film gate is effected by a slipping type clutch means driving the sprocket from a constant speed drive shaft, the clutch being caused to slip when a retractable sprocket stop element engages the teeth of the sprocket intermittently in correspondence to the advance of the successive picture frame through the film gate, the sprocket stop element being intermittently retracted by a cam on the slipping clutch means allowing the clutch means to become non-slipping and freeing the rotary sprocket to rotate.

The invention, accordingly, comprises the features of construction, combination of elements, and arrangement of parts, which will be exemplified in the construction hereinafter set forth and the scope of the invention will be indicated in the claims.

BRIEF DESCRIPTION OF THE DRAWINGS

A fuller understanding of the nature and objects of the present invention will be had from the following detailed description taken in conjunction with the accompanying drawings showing by way of example preferred embodiments of the inventive concept and in which:

FIG. 4 is a longitudinal sectional view of the film feeding means to enlarged scale as taken along the line 4—4 in FIG. 1 and depicting further the manner in which the rotary disc shutter is fixed to the film feeding means drive shaft.

FIG. 5 is an elevational view of a yoke on which the sprocket stop element is carried.

FIG. 6 is a plan view schematically depicting one form of light conductor component which can be used in the projector.

FIG. 7 is similar to FIG. 6 showing a still further form of light conductor component.

FIG. 8 is a fragmentary elevational view of an alternative form of mounting for the sprocket stop element embodied in the film feeding mechanism.

Throughout the following description like reference numerals are used to denote like parts in the drawings.

DESCRIPTION OF THE PREFERRED EMBODIMENTS

Figure 1:
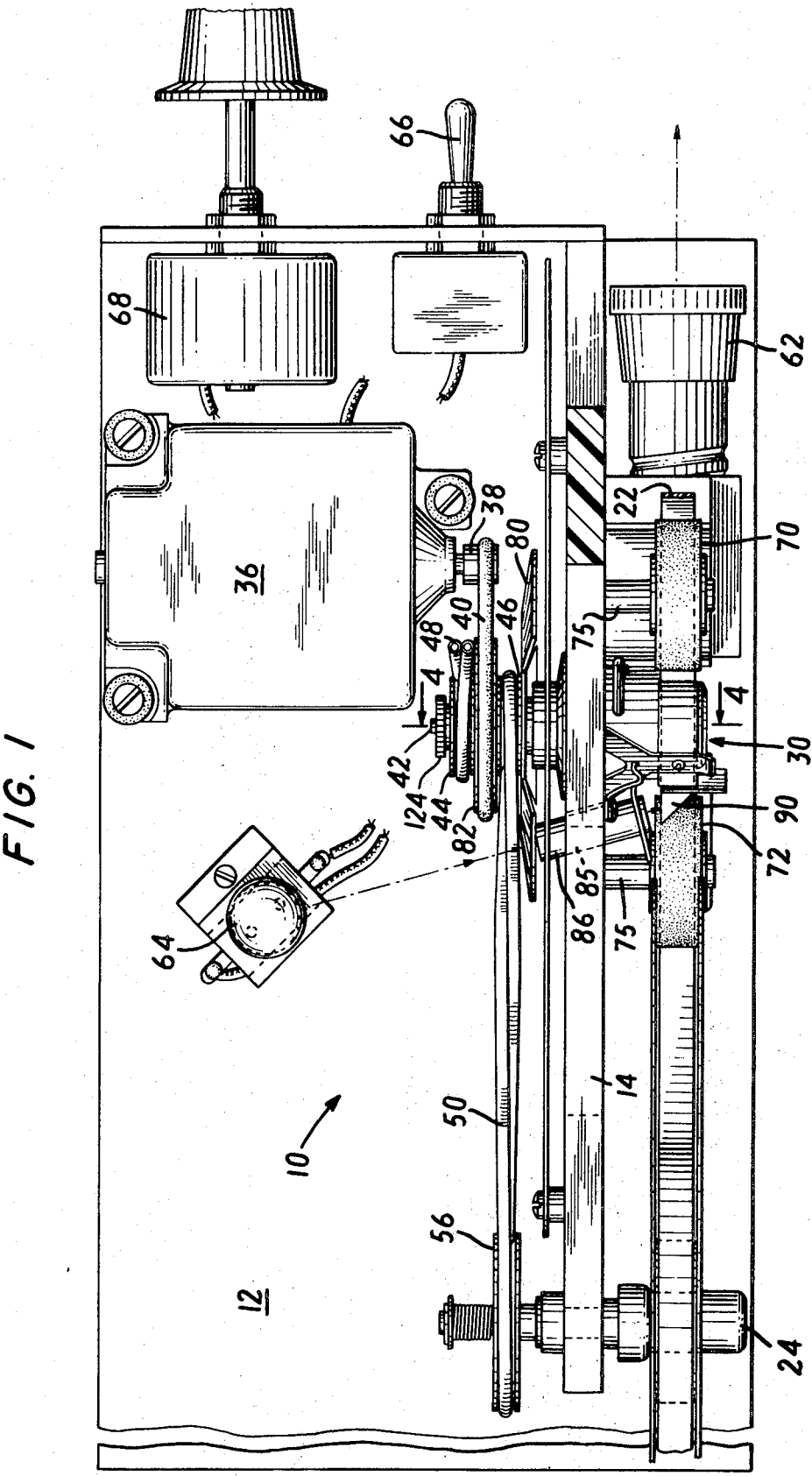
FIG. 1 is a top plan view of a motion picture projector in which has been embodied resilient surfaced rollers located at the entrance of the film to the feeding means and exit of the film from film gate, as well as an improved rotary disc shutter arrangement wherein the disc shutter rotates about the same axis as the film feeding means rotary sprocket rotates with the projection lamp being laterally offset from the projector objective principal axis at a location on one side of an upright wall member, with the film feeding means, resilient rollers, film gate and objective being located at the other side of such wall member.
Figure 2:
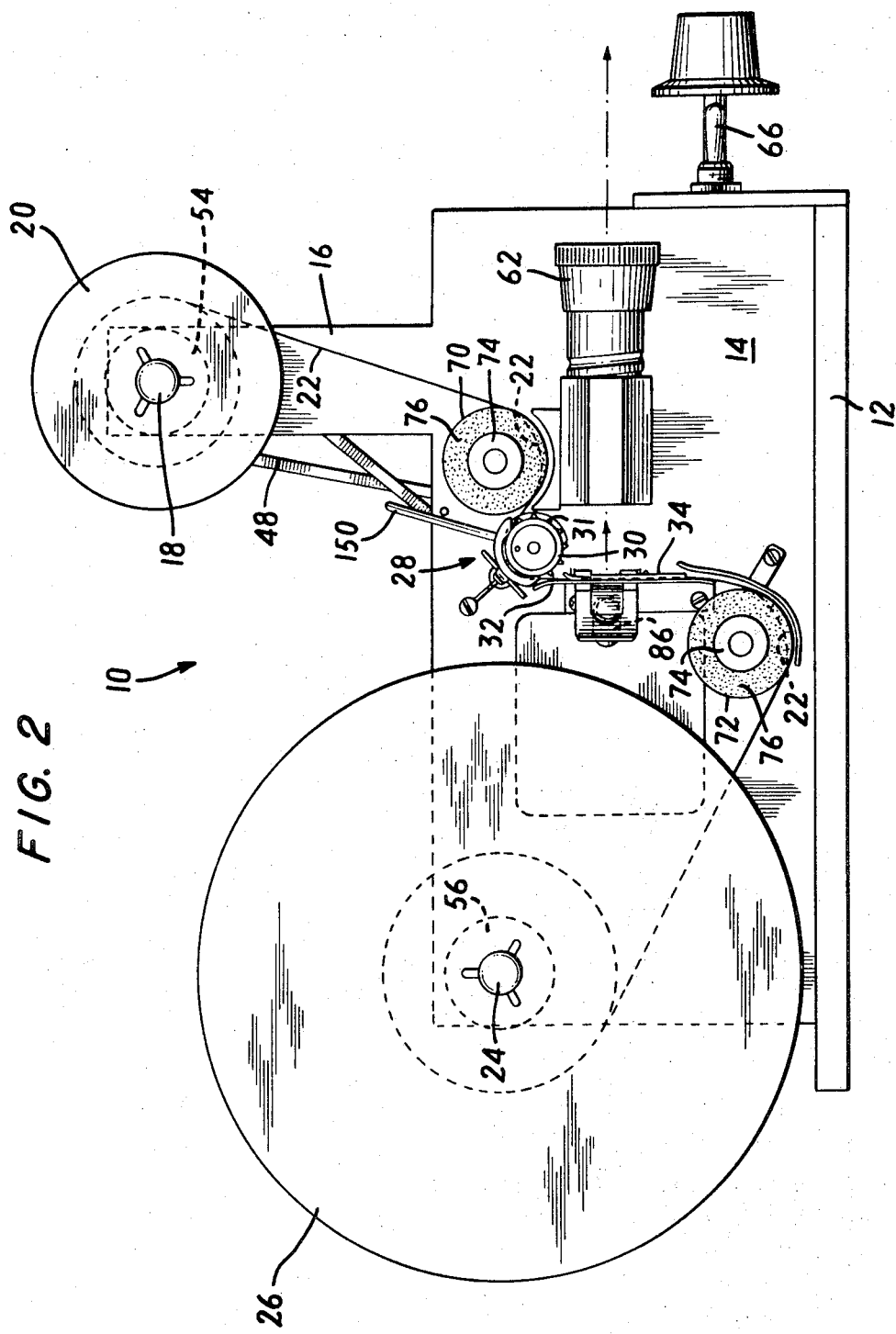
FIG. 2 is a side elevational view of the motion picture projector shown in FIG. 1 to slightly smaller scale particularly showing the arrangement of the resilient surfaced rollers embodied in the projector.
Figure 3:
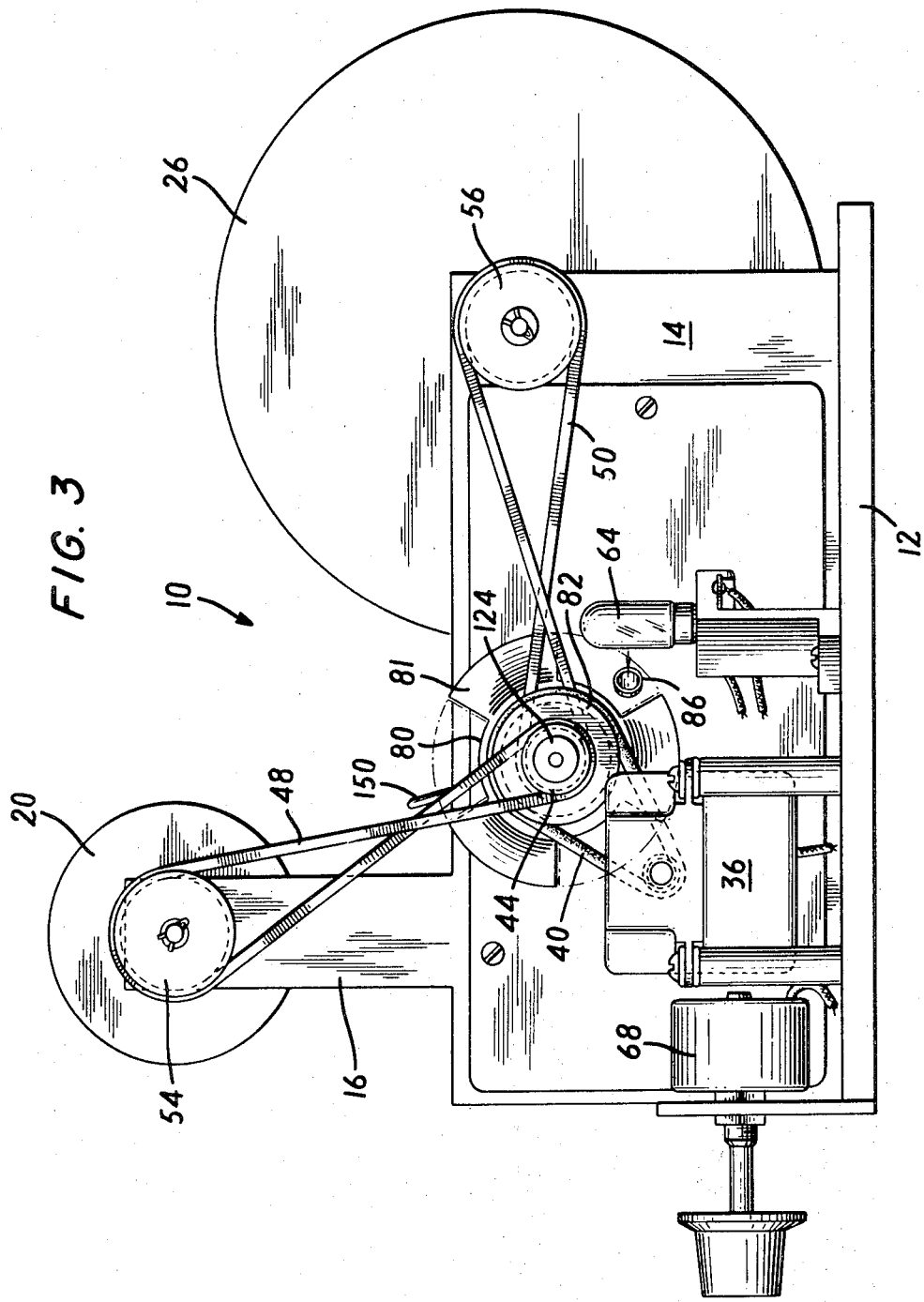
FIG. 3 is an elevational view of the projector from the other side thereof depicting the manner of mounting the rotary disc shutter and projection lamp at such side.

The motion picture projector 10 of the present invention is depicted in detail in FIGS. 1–3. From such figures, it will be noted the projector includes a base 12 to which is connected an elongated upright wall member 14, the upright wall member having a vertical extension 16 adjacent one end and carrying a pivot 18 on which is rotatably mounted a film supply spool 20 for supplying the film 22 which is to be protected. A second pivot 24 is provided at the other end of the upright wall 14 on which is received a film take-up spool 26. Improved film feeding means as provided by the present invention for advancing the film in stepwise movement past the film gate at a requisite speed in accordance with the film size is depicted generally at 28 in FIG. 2, such means also being mounted on the upright wall 14 including a rotary sprocket 30 which engages the film to advance the latter past the projector film gate for viewing. The projector film gate which includes the customary aperture of planar outline is defined by a pair of guide plates 32 and 34 with the rotary sprocket being operative to advance the film in a stepwise movement, the film being momentarily stopped as each successive film frame moves into register with the film gate aperture.

For the purpose of powering all of the operating components of the projector, a single power source, e.g., an electric motor 36 is provided, the electric motor having an output pulley 38 providing drive through belt 40 to rotate a drive shaft 42 mounted in the upright wall 14 (FIG. 4). Fixed to the rotary drive shaft are pulleys 44 and 46 which through means of spring belts 48 and 50 provide drive to the pulleys 54 and 56 associated with the film supply spool 20 and film take-up spool 26, respectively.

Disposed at one side of the upright wall 14 along with the rotary sprocket 30 is a projector objective 62 which has its principal axis disposed longitudinally of the upright wall 14 and parallel thereto. Located at the other side of the upright wall 14 is a projection lamp 64 operation of which is controlled by switch 66. The projector also may include a rheostat 68 for altering the output speed of motor 36 thereby making the projector suitable for projecting films at different speeds.

In accordance with the present invention, it is not necessary to provide either a film unwinding sprocket or a film wind up sprocket at the entry and exit ends of the film gate as is conventional in known types of motion picture projectors. Such sprocket drive devices are provided in known types of projectors in addition to a film feeding device such as a claw mechanism which actually feeds the film past the film gate. The present invention eliminates the need for such forms of drive sprockets and employs instead, a single drive means, namely, a film feeding means including a rotary sprocket 30. The rotary sprocket 30 has sprocket teeth 31 thereon which engage the notches at one side of the film 22 in the customary manner and advance the film at specified linear speed in stepwise movement past the film gate with the operation of the film feeding means being such that the film momentarily stops at the film gate aperture for projection of a frame thereof through the objective 62.

Since the film unwinding from the supply spool 20 can instantaneously have a different linear speed than the speed at which the film must be moved in stepwise movement past the film gate, means must be provided to prevent any damage to the film when the rotary sprocket is actually moving a picture frame into and out of registration with the film gate aperture. If the speed at which the rotary sprocket 30 unwinds film from a supply spool thereof suddenly accelerates, tautening or tensing of the film occurs in the travel course thereof between the supply spool 20 and the film feeding means due to the inertia of the supply spool 20. Similarly, the film in its travel course from the film gate to the take-up spool 26 can also be subjected to a tautening caused by the film being taken up on spool 26 at an instantaneously greater speed than it is being advanced by the film feeding means. For the purpose of compensating for the occurrence of such tautening condition in the film during its travel course through the projector, the projector is provided with a pair of idler rollers 70 and 72 disposed one at a location between the film supply spool 20 and the rotary sprocket 30, and the other at a location between the exit of the film from the film gate and the take-up spool 26. The resilient rollers provide guide means for the film in its travel through the projector and each maintain a loop in the travel course of the film. The idler rollers 70, 72 are each provided with at least a surface layer of resilient material which is radially and circumferentially yieldable to a tautening of the film loops, the yielding of the resilient material functioning to compensate for the presence of tension in the film and thereby preventing tearing or like damage to the film as well as maintaining precision of framing and freedom from flutter. The manner in which the surface layer of the resilient rollers yields to a tension in the film causing the travel course thereof to shorten is depicted in dashed lines in FIG. 2.

The idler rollers 70, 72 each preferably are provided with a central hub part 74 which includes a stub shaft 75 rotatably mounted in wall member 14 and an encircling hollow circular resilient component 76 fixed to the hub part, as for example, by adhesion. The roller components 76 can be made from various materials of a resilient foamed character such as sponge rubber, synthetic plastic foams and like materials.

In accordance with the present invention, additional simplification in the construction of the projector 10 can be achieved by driving the shutter device 80 with the same drive shaft 42 as drives the rotary sprocket 30. Thus, as can be noted in FIG. 4, the shutter disc 80 is fixed to shaft 42 to rotate therewith about the same axis of rotation as the rotary sprocket, an axis which is disposed perpendicular to the principal axis of objective 62, and a single drive pulley 82 only need be employed to transmit drive thereto from the electric motor 36. As seen in FIG. 1, the rotary drive sprocket 30 is mounted at one side of the wall 14 and the shutter disc 80 is disposed at the other side of the wall. For the purpose of transmitting a light beam to the film gate and through the objective 62 from the projection lamp 64 which is located laterally offset and longitudinally spaced from the location of the objective, a passage 85 is provided in upright wall 14 and so positioned in relation to the lamp as to permit a light beam to be directed to a location adjacent, i.e., behind the film gate. To facilitate directing the light beam to such location, a conductor component 86 is received in the passage 85 such conductor component, for example, being an elongated tube or a solid element internally reflective throughout its length. The light beam conducted to the location behind the film gate is disposed at an angle to the principal axis of the objective, and accordingly, a reflector means such as a reflecting prism 90 is supported at such location for reflecting light through the film gate aperture and through the objective 62 codirectionally with the principal axis of the latter. Alternatively and as depicted in FIG. 6, the solid internally reflective condutor component 202 having an output surface 201 can be employed for reflecting light through the projection aperture 204. FIG. 7 depicts a further form of solid internally reflective light conductor component 210 which can be used in the projector, such component conductor being a curved fiber optic bundle having a planar end surface 212 disposed perpendicular to the objective principal axis X—X and parallel to the projection aperture 214.

The shutter disc 80 is fixed to the drive shaft 42 in such relationship with the intermittently rotating rotary sprocket 30 that at least one of the blades 81 of the shutter is in blocking position in front of the light entry end of conductor component 86 whenever the rotary sprocket 30 is advancing a frame of the film 22 into and out of registration with the film gate aperture.

Description will now be given of the construction and arrangement of the film feeding means employed for advancing the film in stepwise movement past the film gate. Referring to FIG. 4, the film feeding means is mounted on upright wall 14 in a cylindrical housing 110, the latter having a number of stepped down segments 112, 114 and 115, the latter comprising a film supporting surface. The housing 110 includes in the bore thereof suitable bushings 116, 118 in which the drive shaft 42 is rotatably received, the drive shaft being fixed to the pulley 82 as described earlier herein. The drive shaft 42 is a hollow element, and passing through the bore thereof is a tension spring 119 which is fixed to a pin 120 at one end and a threaded stud 122 at the other end, the threaded stud 122 being encircled by a nut 124 which can be employed to adjust pressure in the slip clutch means to be described shortly. Mounted at one end of the shaft 42 is an inner clutch plate 126 which is fixed to the shaft to rotate therewith. The clutch plate 126 is provided with an enlarged portion which is disposed in face-to-face contact with the rotary sprocket 30, the latter being an annular component loosely mounted on the clutch plate hub 127. Adjacent the clutch plate 126 and remote from the rotary sprocket is a cam plate 130 having a camming surface formed on the righthand or outer face thereof, the cam plate being unitarily rotatable with the clutch plate 126 being held in such cooperative condition by a tight friction fit therewith. At the other side of the rotary sprocket, there is disposed an outer clutch plate 134 and pin 120 also passes through such outer plate, there also being provided a pin 135 received in the inner clutch plate 126 and extending into outer clutch plate 134 as into passage 137 to keep plate 134 rotating in unison with plate 126. Mounted on cylindrical housing 110 is a sprocket stop element 140 formed with a finger like extension 141 extending axially of the housing and adapted to extend between successive ones of the teeth 31 on the rotary sprocket 30. The sprocket 140 is resiliently mounted, that is to say, it can be displaced axially to the right as viewed in FIG. 4 to move its finger extension 141 from a stopping position against the sprocket teeth when the high point of the cam plate 130 engages the rounded camming abutment or follower surface 142 of the stop. The sprocket stop 140 as shown in FIG. 5 can be made in the manner of a yoke element from any suitable material such as spring steel, being provided at the branches of the yoke with openings 270 by means of which the yoke can be fastened to the cylindrical housing 110. With the shaft 42 rotating at a constant speed, the clutch plate 126 also rotates at a constant speed. However, the motion of the rotary sprocket 30 is of an intermittent character associated with the intermittent stepwise frame-by-frame movement of the film through the projector film gate. The sprocket stop extension 141, when it extends between two teeth of the sprocket, will prevent the sprocket from rotating along with the shaft 42. However, when the high point of the cam 130 shown in phantom lines in FIG. 4 engages against the camming abutment or follower surface 142 of the stop, it will displace the sprocket stop 140 to the right freeing the sprocket to rotate in unison with the shaft 42 a short angular distance in correspondence to the distance required to move one picture frame out of the film gate aperture and position a succeeding picture frame in register with such aperture. With the sprocket stop 140 moved to the right momentarily, a condition of continuous frictional contact between the sprocket, the outer clutch plate 134 and inner clutch plate 126 causes the sprocket 30 to rotate in unison with the clutch plate 126 until the next sprocket tooth engages against the restored sprocket stop 140. Thus the condition of frictional contact is resisted by the stop element and the clutch slips so no drive is transmitted from shaft 42 to sprocket 30. On the other hand when the stop element is retracted the condition of friction is sufficient to permit the rotary sprocket to rotate in unison with the clutch plate 126. For the purpose of restoring the sprocket stop 140 to the leftmost position shown in full lines in FIG. 4, a spring 155 is reclined in a bore passage 157 in member 110 and exerts a leftwardly directed bias against the stop, the spring maintaining the stop in such position except when its force is overcome by the action of cam 130 when the latter forces the stop to the right.

An alternative sprocket stop 240 and its manner of mounting is shown in FIG. 8. The sprocket stop 240 has a finger extension 241 like that earlier described as well as a camming abutment or follower surface 142. The stop 240, however, is supported in housing 110 by means of a sliding rod 243 fixed to extension 241 and slidably received in bore passage 156, the spring 155 exerting bias against rod 243 to restore the store to a sprocket engage position.

A further feature of the present invention provides that the housing 110 in which the film feeding means is mounted is rotatably supported in upright wall 14. By angularly adjusting the positioning of the housing in respect of the axis of rotation of shaft 42, the positioning of the film in the film gate can be shifted to adjust the framing of the picture frames in the film gate aperture. To manually effect such angular positioning or adjustment of the housing 110, a lever 150 is fixed to the housing.

From the foregoing it will be noted thay many improvements in projector construction are provided by the present invention. By using a single rotary sprocket component as the film feeding mechanism in conjunction with a pair of resilient surfaced idler rollers, there is eliminated need for the three driving members provided in prior art mechanisms, i.e., a claw and two separate sprockets, all of which require power drive. Furthermore, the use of a rotary feeding sprocket 30 in place of a claw feed provides that the sprocket teeth engage at one time in more than one of the perforated openings at the side margin of the film thereby distributing the strain on the film. Thus the multiple hole gripping of the film by the sprocket provides that all acceleration movement on the film is in the direction of the film travel in distinction to the sawing motion which accompanies use of a claw for feeding purposes, and contributes to a gentler handling of the film during projection. A further advantage of the use of the rotary sprocket feeding mechanism is that the stop element 140 works directly against an escapement member which itself engages the film (the sprocket) so that wear on either the teeth of the sprocket or the stop element is of no consequence in respect of the possibility of fluttering of the film after prolonged projector service. The use of a stop member in prior art projectors conventionally has been in conjunction with an escapement wheel positioned remote from the film feeding sprocket, and accordingly, wear of the escapement member is not duplicated in the sprocket so that inaccurate registration of the film with attendant noticeable flutter becomes a consequence of the wear after a period of time.

While there is above disclosed but certain embodiments of motion picture projector in accordance with the present invention, it is possible to produce still other embodiments without departing from the scope of the inventive concept herein disclosed and accordingly, it should be understood that all matter contained in the above description and in the accompanying drawings should be interpreted as illustrative and not in a limiting sense.

What is claimed is:

1. In a motion picture projector including film supply means, said film having successive picture frames thereon and spaced perforations along at least one margin thereof, means providing a projector film gate including a projection aperture, film feeding means to advance the film in stepwise movement through said film gate with the frames on said film stopped momentarily in register with said aperture, said film feeding means comprising a rotary sprocket having teeth thereon said teeth being received in the perforations in the film, a constant speed drive shaft, slip clutch means connecting said sprocket with said drive shaft for driving the same, a retractable stop element normally engageable with one of the teeth on said sprocket to prevent rotation of said rotary sprocket, said slip clutch means slipping when said stop element is engaged with a sprocket tooth whereby drive from said drive shaft can not be transmitted to said sprocket, said clutch means including a cam plate rotatable in unison with said shaft and having a cam thereon, said cam engaging a following surface on said stop element to retract said stop element and permit said slip clutch means to transmit drive to said rotary sprocket to cause it to rotate in unison with said drive shaft thereby advancing said film.

2. In a motion picture projector including film supply means, said film having successive picture frames thereon and spaced perforations along at least one margin thereof, means providing a projector film gate including a projection aperture, film feeding means to advance the film in stepwise movement through said film gate with the frames on said film stopped momentarily in register with said aperture, said film feeding means comprising a rotary sprocket having teeth thereon said teeth being received in the perforations in the film, a constant speed drive shaft, slip clutch means connecting said sprocket with said drive shaft for driving the same, a retractable stop element normally engageable with one of the teeth on said sprocket to prevent rotation of said rotary sprocket, said slip clutch means slipping when said stop element is engaged with a sprocket tooth whereby drive from said drive shaft can not be transmitted to said sprocket, said clutch means including a cam plate rotatable in unison with said shaft and having a cam thereon, said cam engaging a following surface on said stop element to retract said stop element and permit said slip clutch means to transmit drive to said rotary sprocket to cause it to rotate in unison with said drive shaft thereby advancing said film.

said slip clutch means further including a clutch plate fixed to said drive shaft, said cam plate being fixed to said clutch plate, said clutch plate having a hub and an enlarged portion thereon, said rotary sprocket being loosely rotatably mounted on the hub of said clutch plate and having a side thereon in face-to-face contact with the enlarged portion of said clutch plate, an outer clutch plate at the other side of said rotary sprocket and fixed to said clutch plate for rotation in unison with said clutch plate, said clutch plate, rotary sprocket and outer clutch plate being in a continuous condition of frictional contact with each other, but said clutch plate and outer clutch plate slipping in respect of said rotary sprocket when said stop element engages one of the rotary sprocket teeth, the frictional engagement of said clutch plate, outer clutch plate and rotary sprocket causing rotation of said sprocket when said stop element is retracted.

3. The motion picture projector of claim 2 further comprising a housing in which said drive shaft is rotatably supported, said housing having an end thereon, said clutch means and rotary sprocket being disposed adjacent said end, said stop element being supported on said housing end and including a resiliently mounted finger normally extending between successive ones of the teeth on said sprocket, said finger being retracted away from said rotary sprocket when engaged by said cam, and a spring engaging said resilient finger for urging it out of its retracted position.

* * * * *

UNITED STATES PATENT OFFICE
CERTIFICATE OF CORRECTION

Patent No. 3,806,246          Dated April 23, 1974

Inventor(s) Miklos Kemencyky

It is certified that error appears in the above-identified patent and that said Letters Patent are hereby corrected as shown below:

Column 1, line 8, after "take-up" and before "along" insert the word --spool--.

Column 5, line 54, after "accelerates," and before "taut" insert the word --a--.

Column 7, line 36, after "outer" and before "plate" insert the word --clutch--.

Column 8, line 31, "156" should read --157--.

Column 10, line 16, "can" should read --cam--.

Signed and sealed this 1st day of October 1974.

(SEAL)
Attest:

McCOY M. GIBSON JR.
Attesting Officer

C. MARSHALL DANN
Commissioner of Patents